(12) United States Patent
Min

(10) Patent No.: US 7,401,940 B2
(45) Date of Patent: Jul. 22, 2008

(54) UNDERHOOD WORK LIGHT

(75) Inventor: Li Min, Hangzhou (CN)

(73) Assignee: Yifan Wang, Jianggan Town, Hangzhou (CN)

( * ) Notice: Subject to any disclaimer, the term of this patent is extended or adjusted under 35 U.S.C. 154(b) by 0 days.

(21) Appl. No.: 11/619,050

(22) Filed: Jan. 2, 2007

(65) Prior Publication Data

US 2008/0117644 A1 May 22, 2008

(30) Foreign Application Priority Data

Nov. 17, 2006 (CN) .................... 2006 2 0140235 U

(51) Int. Cl.
*F21L 4/00* (2006.01)
(52) U.S. Cl. ........................ 362/191; 362/217; 362/220; 362/396; 362/486; 362/496
(58) Field of Classification Search ................. 362/184, 362/191, 217, 220, 396, 486, 496
See application file for complete search history.

(56) References Cited

U.S. PATENT DOCUMENTS

| | | | | |
|---|---|---|---|---|
| 4,197,573 A | * | 4/1980 | Thatch | 362/396 |
| 5,836,679 A | * | 11/1998 | Klamm | 362/396 |
| 6,799,863 B2 | * | 10/2004 | Offiler et al. | 362/220 |
| 6,979,100 B2 | * | 12/2005 | Reiff et al. | 362/184 |

FOREIGN PATENT DOCUMENTS

CN 02265932.3 7/2003

* cited by examiner

*Primary Examiner*—Stephen F Husar
(74) *Attorney, Agent, or Firm*—Global IP Services; Tianhua Gu

(57) ABSTRACT

A underhood work light has a light tube and a pole-type base, the light tube is installed on the said base, the base is a hollow tube; a claw is installed at each end of the base by holding the stem of the said claw into the base tube, the claw stem which can slide in the base is connected with the base through a spring, the range between the claws is matched with the width of the hood; The benefits of the present invention are as follows: by pulling outward the both claws, the work light is fixed onto or taken off from the hood conveniently, and the storage battery makes the work light independent on the out power source, so the invention is convenient and easy to use.

1 Claim, 5 Drawing Sheets

UNDERHOOD WORK LIGHT

CROSS REFERENCE TO THE RELATED PATENT APPLICATION

This application claims the priority of the Chinese patent application No. 200620140235.1, filed on Nov. 17, 2006.

FIELD OF THE INVENTION

This invention relates to a work light for the maintenance of automobile therein.

BACKGROUND OF THE INVENTION

Underhood is a location where automobile parts are assembled; in a general way automobile's engine is located at the position and needs to be hourly maintained. As the hood shadows light, even though it is in daytime, such maintenance often needs additional lighting. Conventional work light for the maintenance of automobile has not a fixing means to fix the light onto the hood, someone else is needed to hold a work light to provide lighting, being inconvenient very much. China patent No. 02265932.3 presents an underhood work light with fixing means. The light has a magnetic frame with which the light can be fixed onto the hood of automobile; additionally it has a hook to fix the light onto the hood. As viewed from the structure, this design is only suitable for the fixing at vertical flat wall, while for the slant side as under hood, the light is difficult to be fixed; its hook has not a fixing point either. In addition, as the surface of automobile parts is uneven, there is not a suitable fixing position for magnetic adsorption. Moreover, the light cannot illuminate whole engine cabinet evenly in the width. If whole engine cabinet need to be maintained, a movable lamp needs to be used, it is inconvenient.

SUMMARY OF THE INVENTION

It is an object of the present invention to provide an underhood work light easy to be fixed or unfixed onto the hood therein free from the aforementioned disadvantages, and one which can illuminate whole engine cabinet evenly in the width.

According to the present invention there is provided a underhood work light comprising:

a light tube and a pole-type base, the said light tube is installed on the said base; the said base is a hollow tube, and a claw is installed at each end of the base tube by holding the stem of the said claw into the base tube; the claw stem which can slide in the base is connected with the base through a spring; the range between the claws is matched with the width of the hood.

Moreover, the light tube has a handle, the handle holds a storage battery; in another way the storage battery is installed in the base, and the storage battery is conducted to the light through a clasp by which the light tube is fixed onto the base.

Furthermore, the longitudinal trough on the base holds the stem of the said clasp, thus the clasp is fixed to the base while it can slide to adjust the range between the two clasps to fit the light tube.

The benefits of the present invention are as follows: by pulling outward the both claws, the work light is fixed onto or taken off from the hood conveniently, and the storage battery makes the work light independent on the out power source, so the invention is convenient and easy to use.

BRIEF DESCRIPTION OF THE DRAWINGS

In order to that the present invention may be better understood, a preferred embodiment thereof will now be described with reference to the accompanying drawings, in which.

DETAIL DESCRIPTION OF THE INVENTION

Figure 1:
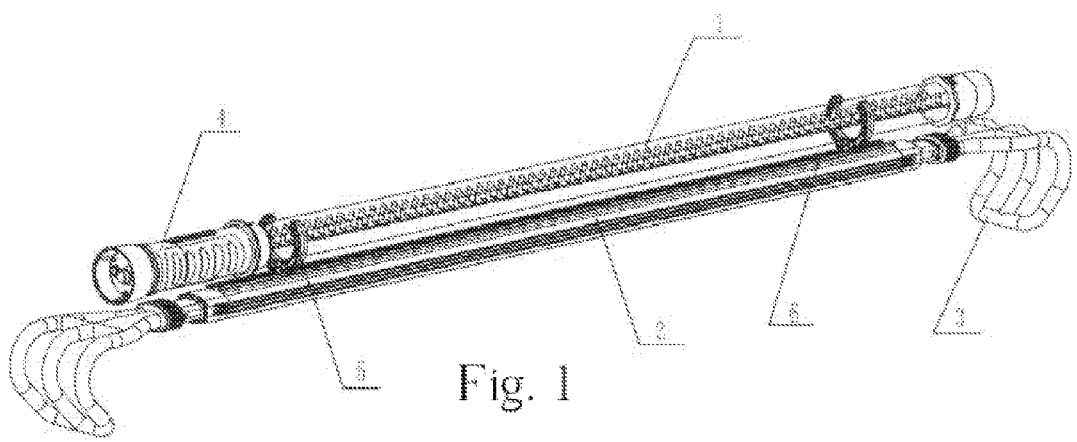
FIG. 1 is a three-dimensional figure of the invention.
Figure 2:
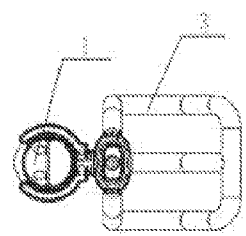
FIG. 2 is a cross-section figure of the invention.
Figure 3:
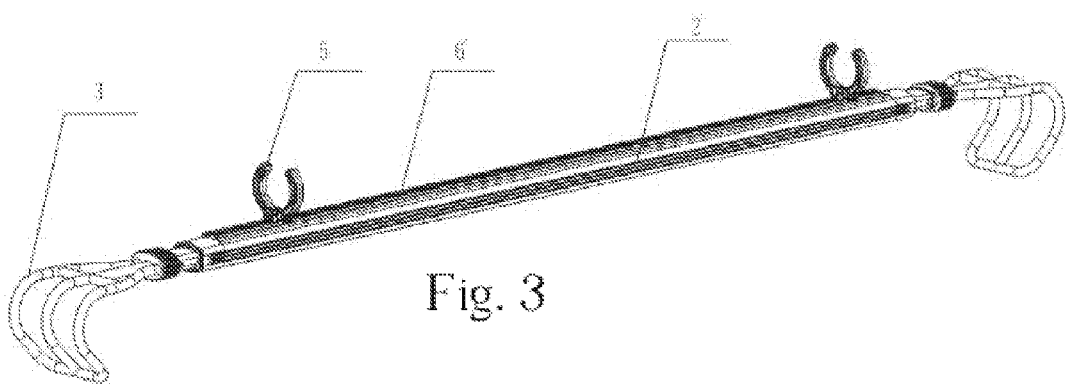
FIG. 3 is a three-dimensional of the base.
Figure 4:
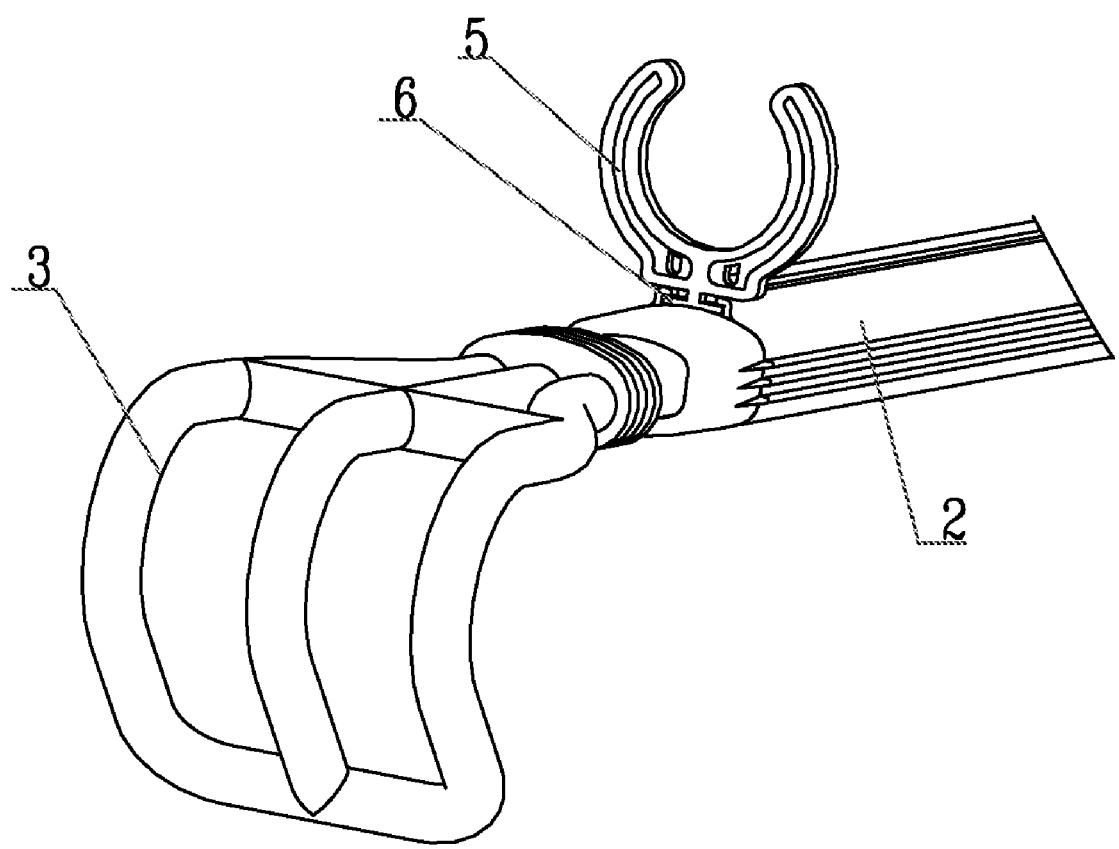
FIG. 4 is a local view showing the clasp 5 and the base 2.
Figure 5:
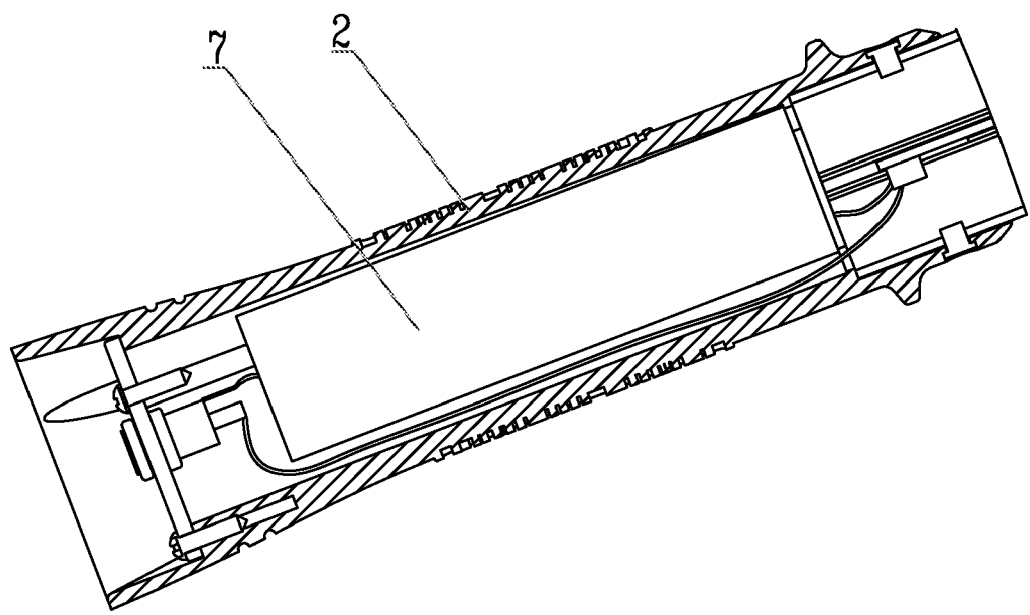
FIG. 5 is a fragmentary view of handle 4 showing the storage battery.
Figure 6:
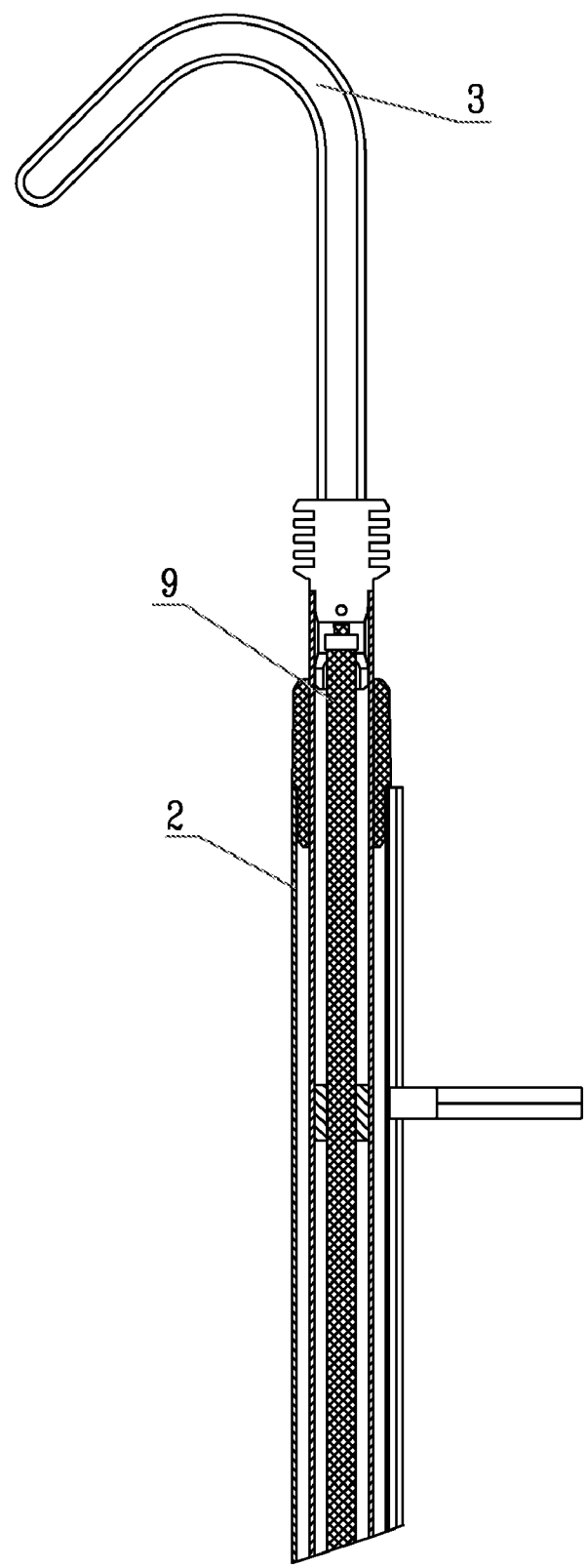
FIG. 6 is a local fragmentary view of the base 2.
Figure 7:
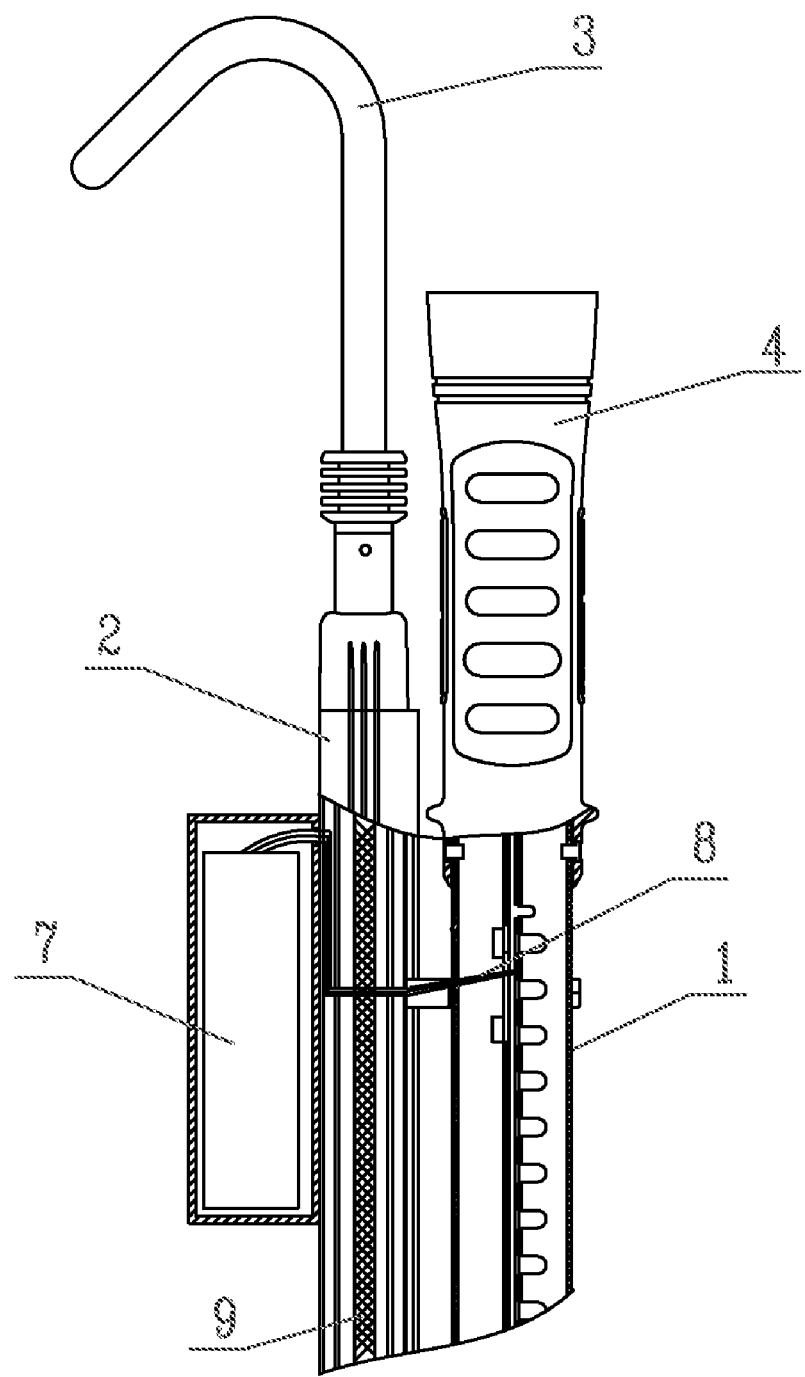
FIG. 7 is a local fragmentary view of the base 2 showing the electric conduction when the storage battery is installed in the base 2

Referring now to the drawings, in which the same numerals denote the same parts, there is shown in FIGS. 1 and 2 and 3 a underhood work light comprising: a light tube 1 and a pole-type base 2, the said light tube 1 is installed on the said base 2; the said base 2 is a hollow tube, and a claw 3 is installed at each end of the base tube 1 by holding the stem of the said claw 3 into the base tube; the claw stem which can slide in the base 3 is connected with the base 3 through a spring 9; the range between the claws 3 is matched with the width of the hood.

Moreover, the light tube has a handle 4, the handle 4 holds a storage battery 7; the longitudinal trough 6 on the base 2 holds the stem of the said clasp 5, thus the clasp 5 is fixed to the base 2 while it can slide to adjust the range between the two clasp 5 to fit the light tube. The light tube is fixed onto the clasp 5.

By pulling outward the both claws, the claws can be put on the two side of the hood. When the claws are drawn inward by the said spring 9, the work light is buckled onto the hood. By the same way, the work light can be take off from the hood conveniently.

In the embodiment 2, all the parts and construction are the same with the embodiment 1 except that storage battery 7 is installed in the base 2, and the storage battery 7 is conducted by the wire 8 to the light through a clasp 5 by which the light tube is fixed onto the base.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. An underhood work light comprising:
   a light tube, a base made by a hollow tube, two claws each fixed with a stem, said stem being moveably installed into the hollow tube of said base at each end;
   said stems being connected each other by a spring, thereby said claws being held on the two ends of said base by said spring through the stems, when using the claws can be pulled out to adjust the range between the claws to match with the width of a hood;
   a longitudinal trough being located on back of said base, two clasps being moveably installed in said longitudinal trough, thereby the range between said two clasps being adjustable for clasping said light tube;
   a storage battery being installed in the base and the storage battery is electrically connected with the light tube through the clasp.

* * * * *